United States Patent [19]

Renner

[11] Patent Number: 5,321,103

[45] Date of Patent: Jun. 14, 1994

[54] COMPOSITIONS COMPRISING AMINOPLAST RESINS AND SOLID COLLOIDAL CONDENSATION POLYMERS

[75] Inventor: Alfred Renner, Muntelier, Switzerland

[73] Assignee: Ciba-Geigy Corporation, Ardsley, N.Y.

[21] Appl. No.: 131,272

[22] Filed: Oct. 4, 1993

Related U.S. Application Data

[63] Continuation of Ser. No. 741,390, Aug. 7, 1991, abandoned.

[30] Foreign Application Priority Data

Aug. 9, 1990 [CH] Switzerland ............... 2590/90-9

[51] Int. Cl.$^5$ ................ C08L 61/24; C08L 61/28
[52] U.S. Cl. ................ 525/515; 525/509; 525/517
[58] Field of Search ............ 525/515, 517, 509

[56] References Cited

U.S. PATENT DOCUMENTS

| | | | |
|---|---|---|---|
| 3,716,483 | 2/1973 | Renner | 210/693 |
| 3,931,063 | 1/1976 | Renner | 524/767 |
| 3,988,522 | 10/1976 | Berstein | 525/509 |

FOREIGN PATENT DOCUMENTS 1319269  4/1962  France ................ 525/515

OTHER PUBLICATIONS

Makromol. Chem. vol. 120 pp. 68–86 (1968).
Makromol. Chem. vol. 149 pp. 1–27 (1971).

*Primary Examiner*—James J. Seidleck
*Assistant Examiner*—W. Robinson H. Clark
*Attorney, Agent, or Firm*—Luther A. R. Hall; JoAnn Villamizar

[57] ABSTRACT

Free-flowing powdery compositions comprising

A) liquid or semi-solid etherified aminoplast resins and
B) solid colloidal condensation polymers of urea or melamine and formaldehyde having a pore volume greater than 1 cm$^3$/g and a specific surface area greater than 5 m$^2$/g.

These compositions can be used, for example, as powder coating compositions.

4 Claims, No Drawings

COMPOSITIONS COMPRISING AMINOPLAST RESINS AND SOLID COLLOIDAL CONDENSATION POLYMERS

This application is a continuation of application Ser. No. 07/741,390, filed Aug. 7, 1991, now abandoned.

The present invention relates to compositions comprising aminoplast resins and solid colloidal condensation polymers of urea or melamine and formaldehyde, to a process for the preparation of cured products using said compositions, and to the use of the novel compositions.

Aminoplast resins compositions are well known for a wide variety of applications and technologies to those skilled in the art. However, for specific utilities, for example in powder coating and compression moulding technology, the use of liquid aminoplast resins is not possible or entails considerable difficulties. For example, ε-caprolactam may be eliminated during stoving from the most widely used powder coating compositions prepared from hydroxyl-terminated polyesters and capped isocyanates, and crystallises out in powder coating installations.

Solid colloidal condensation polymers of urea or melamine and formaldehyde are known to those skilled in the art from, for example, Makromol. Chem. 120, 68 (1968) and from Makromol. Chem. 149, 1 (1971). These condensation polymers find utility, for example, as white pigments for paper manufacture and as reinforcing agents for elastomers. Further, the polymers are suitable for wastewater purification and for use in agricultural chemistry.

It has now been found that liquid and semi-solid etherified aminoplast resins can be converted into free-flowing and non-aggregating powders with the aid of colloidal condensation polymers of urea or melamine and formaldehyde.

Accordingly, the invention relates to free-flowing powdery compositions comprising A) liquid or semi-solid etherified aminoplast resins and B) solid colloidal condensation polymers of urea or melamine and formaldehyde having a pore volume greater than 1 cm$^3$/g and a specific surface area greater than 5 m$^2$/g.

The liquid and semi-solid etherified aminoplast resins used in the compositions of this invention are typically compounds based on urea, thiourea, melamine, acetoguanamine (2,6-diamino-4-methyl-1,3,5-triazine), benzoguanamine (2,6-diamino-4-phenyl-1,3,5-triazine), glycol uril (tetrahydroimidazo[4,5-]imidazole-2,5-(1H,3H)-dione) or triacetone diurea and formaldehyde, which are etherified with $C_1$-$C_8$alcohols.

These alcohols are typically ethanol, 1-propanol, 2-propanol, 1-butanol, 2-butanol, tert-butanol, pentanol, hexanol, heptanol, octanol and, preferably, methanol.

Preferred compositions are those wherein the aminoplast resin is a $C_1$-$C_8$alkoxymethylmelamine, $C_1$-$C_8$alkoxymethylurea or $C_1$-$C_8$alkoxymethylbenzoguanamine.

Most preferably, the aminoplast resin is hexamethoxymethylmelamine [2,4,6-tris(dimethoxymethylamino)-s-triazine].

If desired, a mixture of aminoplast resins can be used in the novel compositions.

The solid colloidal condensation polymers of urea or melamine and formaldehyde having a pore volume greater than 1 cm$^3$/g and a specific surface area greater than 5 m$^2$/g, which are used in the compositions of this invention, and the preparation thereof, are described in Makromol. Chem. 120, 68 (1968) and in Makromol. Chem. 149, 1 (1971).

Preferred condensation polymers are those having a pore volume greater than 2 cm$^3$/g.

Urea/formaldehyde condensation polymers are especially preferred.

Methods of determining the pore volume and the specific surface area are known to the skilled person. Thus, for example, the pore volume can be determined by mercury porosimetry. The specific surface area can be measured, for example, by modified BET adsorption of nitrogen by the method of Haul and Dumbgen (Chem.-Ing.-Techn. 35, 586 (1963)).

Preferred compositions are those in which the weight ratio of component A to component B is 1.8–0.4:1.

Particularly preferred compositions are those in which the weight ratio of component A to component B is 1.6–0.8:1.

The compositions of this invention are normally prepared by injecting, spraying or adding dropwise component A to the fluidised or stirred component B. Preferably component A is added in a relative amount such that the softening temperature of the compositions remains above 100° C.

If component A has too high a viscosity for the above addition methods, then it can be diluted with a suitable solvent, preferably an aliphatic alcohol, more particularly n-butanol, which is removed during the addition, preferably under vacuum.

It was not to be expected that the practice of this invention would result in free-flowing, non-tacky and non-aggregating powders which permit the use of intrinsically liquid aminoplast resins, for example in powder coating and compression moulding technology, or in the use of the novel compositions as adhesives and casting resins.

Thus, for example, it is possible to formulate powder coating compositions which comprise the novel compositions, hydroxyl-terminated polyesters, (latent) acid curing catalysts and optional customary modifiers such as pigments (for example $TiO_2$), flow control agents and the like. Curing catalysts are preferably esters of p-toluenesulfonic acid which has been hardened with the above defined component B. A particularly preferred curing catalyst is 1,4-di-p-toluenesulfonoxy-butane.

Resin coatings of good hardness and high impact strength as well as excellent weathering resistance are obtained. Insignificant elimination of methanol occurs when stoving the powder coating compositions. It was unexpected that, despite this elimination of alcohol during stoving, flawless, hard-elastic, high-lustre films which are free from blisters and pinholes would be obtained.

The invention relates also to a process for the preparation of cured products which comprises the use of the novel compositions.

The invention further relates to the use of the novel compositions for surface protection.

Some preferred embodiments of the invention are described in the following Examples.

I. Preparation of the solid aminoplast resins

EXAMPLE 1

30 g of a urea/formaldehyde condensation polymer (Pergopak ® M 2; ex Martinswerk, FRG), predried at 120° C., are stirred at 135 rpm in an IKA RW-20 laboratory reactor, supplied by Jahnke & Kunkel (FRG).

Then 30 g of hexamethoxymethylmelamine are added dropwise to this fluid powder over 10 minutes, giving 60 g of a white free-flowing powder which has a nitrogen content of 27.7% and a softening point of 225° C. (measured on a Kofler bench).

EXAMPLE 2

In the same apparatus as in Example 1, 30 g of Pergopak® M 2 are mixed with 45 g of hexamethoxymethylmelamine. The white free-flowing powder contains 26.52% of nitrogen and has a softening point of 190°-200° C. (measured on a Kofler bench).

EXAMPLE 3

In the same apparatus as in Example 1, 33 g of a urea/formaldehyde condensation polymer (Pergopak® M; ex Martinswerk, FRG), predried at 120° C., are mixed with 67 g of hexamethoxymethylmelamine. The crumbly, somewhat tacky product obtained has a nitrogen content of 25.6%. This Example illustrates a high loading of Pergopak® M with an aminoplast resin.

EXAMPLE 4

147 g of a melamine/formaldehyde resin etherified with n-butanol (degree of etherification 35%), which is in the form of a 68% solution in n-butanol, are diluted with 700 ml of butanol. This solution is injected into a rotary evaporator which contains 67 g of Pergopak® M and whose round flask rotates at 140° C. The addition is made proportionally to the removal of solvent by distillation (p=2000 Pa). Subsequently 161.8 g of a white free-flowing powder are discharged. The powder has a nitrogen content of 28.1% and a softening point of 275° C. (measured on a Kofler bench).

EXAMPLE 5

As described in Example 4, 104 g of methylolmelamine butyl ether (72% solution in butanol, degree of etherification 42.5%), which is diluted with 500 ml of n-butanol, are injected at 140° C./2000 Pa into the rotary evaporator which contains 67 g of Pergopak® M. Subsequently 146.85 g of a white free-flowing powder are discharged. The powder has a nitrogen content of 26.3% and a softening point of 275° C. (measured on a Kofler bench).

EXAMPLE 6

As described in Example 4, 81.0 g 4 of a colloidal melamine/formaldehyde polymer (specific surface area 253 m²/g) are impregnated with 81.0 g of methylolmelamine butyl ether (72% solution in n-butanol, degree of etherification 42.5%), which is diluted with 700 ml of n-butanol. Yield: 139.3 g of a white free-flowing powder which has a nitrogen content of 33.7% and a softening point of 250° C. (measured on a Kofler bench).

EXAMPLE 7

As described in Example 4, 75.0 g of Pergopak® M are impregnated with 119 g of butylated urea/formaldehyde resin which is diluted with 800 ml of n-butanol, giving 173.0 g of a white free-flowing powder which has a nitrogen content of 22.7% and a softening point of 275° C. (measured on a Kofler bench).

EXAMPLE 8

As described in Example 4, 67.0 g of Pergopak® M are impregnated with 151 g of butylated benzoguanamine/formaldehyde resin (66% solution in butanol, degree of etherification 22.75%), which is diluted with 200 ml of n-butanol, giving 166.2 g of a white free-flowing powder which has a nitrogen content of 26.2% and a softening point of 275°-300° C. (measured on a Kofler bench).

II. Use Examples

A powder coating composition is prepared by mixing the following components:
- 63.9 g of a finely powdered hydroxyl-terminated polyester (Arakote® 3109, ex Ciba-Geigy Corp.)
- 6.1 g of the powder according to Example 2
- 26.77 g of titanium dioxide
- 1.5 g of flow control agent
- 1.5 g of benzoin
- 0.23 g of 1,4-di-p-toluenesulfoxybutane.

This mixture is homogenised on a heated differential roll mill, comminuted, and then finely milled in a pin mill. A steel sheet is then coated by electrostatic spraying. After stoving for 20 minutes at 190° C., a flawless, smooth white resin film having a thickness of 50 μm is obtained. The following properties are measured:
pencil hardness: H
impact strength (on the back): 184 cm.kg
gloss at 60°: 93%
rubbing test with 2-butanone (by hand): >200 cycles
gel time: 282 s.

EXAMPLE 10

A powder coating composition is prepared by mixing the following components:
- 57.5 g of a finely powdered hydroxyl-terminated polyester (Arakote® 3109, ex Ciba-Geigy Corp.)
- 12.5 g of the powder according to Example 8
- 26.7 g of titanium dioxide
- 1.5 g of flow control agent
- 1.5 g of benzoin
- 0.3 g of 1,4-di-p-toluenesulfoxybutane.

This mixture is homogenised on a heated differential roll mill, comminuted, and then finely milled in a pin mill. A steel sheet is then coated by electrostatic spraying. After stoving for 20 minutes at 200° C., a flawless, smooth white resin film having a thickness of 50 μm is obtained. The following properties are measured:
pencil hardness: H
impact strength (on the back): <12 cm.kg
gloss at 60°: 93%
rubbing test with 2-butanone (by hand): 57 cycles
gel time: 267 s.

What is claimed is:

1. A surface protective composition consisting of a free-flowing powder, comprising
   A) a liquid or semi-liquid etherified aminoplast resin and
   B) a solid colloidal condensation polymer of urea or melamine and formaldehyde having a pore volume greater than 1 cm³/g and a specific surface area greater than 5 m²/g, wherein the weight ratio of component A to component B is 1.6-0.8:1.

2. A composition according to claim 1, wherein component A is a $C_1$-$C_8$alkoxymethylmelamine, $C_1$-$C_8$alkoxymethylurea or $C_1$-$C_8$alkoxymethylbenzoguanamine.

3. A composition according to claim 1, wherein component B has a pore volume greater than 2 cm³/g.

4. A composition according to claim 1, wherein component B is a urea/formaldehyde condensation polymer.

* * * * *